(12) United States Patent
Ye et al.

(10) Patent No.: US 8,161,117 B2
(45) Date of Patent: Apr. 17, 2012

(54) MULTI-MEDIA MESSAGING

(75) Inventors: Zhou Ye, Fremont, CA (US); Thomas Wilsher, San Francisco, CA (US); Jibin Xiang, San Jose, CA (US); Jimmy Shi, Santa Clara, CA (US); Ali Shah, Solna (SE)

(73) Assignee: Oracle International Corporation, Redwood Shores, CA (US)

( * ) Notice: Subject to any disclaimer, the term of this patent is extended or adjusted under 35 U.S.C. 154(b) by 1277 days.

(21) Appl. No.: 10/933,836

(22) Filed: Sep. 3, 2004

(65) Prior Publication Data

US 2006/0053227 A1   Mar. 9, 2006

(51) Int. Cl.
*G06F 15/16* (2006.01)

(52) U.S. Cl. ........ 709/206; 709/205; 709/204; 709/207; 709/208

(58) Field of Classification Search .................. 709/206, 709/205, 207, 204, 208
See application file for complete search history.

(56) References Cited

U.S. PATENT DOCUMENTS

| | | | |
|---|---|---|---|
| 5,742,668 A | 4/1998 | Pepe et al. | |
| 6,055,240 A | 4/2000 | Tunnicliffe | |
| 6,421,707 B1 | 7/2002 | Miller et al. | |
| 6,564,261 B1 | 5/2003 | Gudjonsson et al. | |
| 6,594,349 B2 | 7/2003 | Fortman | |
| 6,618,763 B1 | 9/2003 | Steinberg | |
| 6,668,043 B2 | 12/2003 | Hyziak et al. | |
| 6,690,262 B1 | 2/2004 | Winnett | |
| 7,277,951 B2 * | 10/2007 | Marriott et al. | 709/228 |
| 7,287,058 B2 * | 10/2007 | Loveland et al. | 709/206 |
| 2001/0003202 A1 | 6/2001 | Mache et al. | |
| 2001/0027478 A1 | 10/2001 | Meier et al. | |
| 2002/0032761 A1 * | 3/2002 | Aoyagi et al. | 709/223 |
| 2003/0118353 A1 | 6/2003 | Baller et al. | |
| 2003/0212818 A1 | 11/2003 | Klein et al. | |
| 2004/0128342 A1 * | 7/2004 | Maes et al. | 709/200 |
| 2005/0009541 A1 | 1/2005 | Ye et al. | |
| 2005/0022116 A1 * | 1/2005 | Bowman et al. | 715/513 |
| 2005/0266884 A1 * | 12/2005 | Marriott et al. | 455/558 |
| 2006/0291471 A1 * | 12/2006 | Heuer et al. | 370/395.5 |

OTHER PUBLICATIONS

XSL Transformations (XSLT), Version 1.0, http://www.w3.org/TR/xslt, May 6, 2005, 102 pages.

* cited by examiner

*Primary Examiner* — Jeffrey Pwu
*Assistant Examiner* — Abdelnabi Musa
(74) *Attorney, Agent, or Firm* — Kilpatrick Townsend & Stockton LLP

(57) ABSTRACT

Methods, systems, and machine-readable mediums are disclosed for creating multimedia messaging service (MMS) messages. In one embodiment, the method comprises receiving a message in a first format, adapting the message to a MMS message, and sending the MMS message to a user device.

30 Claims, 5 Drawing Sheets

MULTI-MEDIA MESSAGING

BACKGROUND OF THE INVENTION

A variety of technologies exist for communicating with a user. One such technology is multimedia message service (MMS). MMS provides the ability to communicate messages that include multimedia content, such as pictures or other types of graphics, audio, and streaming video content. Content providers or other applications are able to send MMS messages to a user device by using a Multimedia Messaging Service Center (MMSC) to send the MMS messages.

In order to send a MMS message using the MMSC, the content provider or application must use a scripting language called Synchronized Media Integration Language format. This scripting language is unfamiliar to most content providers and application developers. Thus, it may be difficult for content and application providers to find developers familiar with SMIL. Content and application providers must therefore either choose to invest time and money to train developers or to not provide MMS content and messaging capability.

BRIEF SUMMARY OF THE INVENTION

Methods, systems, and machine-readable mediums are disclosed for creating multimedia messaging service (MMS) messages. In one embodiment, the method comprises receiving a message in a first format. The message is adapted to a MMS message. In some embodiments, adapting the message may comprise transcoding the message from the first format to a Synchronized Media Integration Language (SMIL) format. The MMS message is then sent to a user device.

The method may further comprise determining a recipient for the message and determining a device associated with the recipient. In these embodiments, sending the MMS message may comprise sending the MMS message to the determined device at the associated device identifier. The method may also include determining one or more formats supported by the device. Adapting the message may include converting files, such as a graphic or audio file, to a format supported by the device.

In another embodiment, a method is disclosed which comprises receiving a message in an extendable markup language format. The message is adapted to a SMIL format. Adapting the message includes retrieving one or more external files referenced by the message and packaging the retrieved files in the adapted message. The adapted message is then sent to a Multimedia Messaging Service Center for delivery to a user.

In a third embodiment, a method is disclosed which comprises receiving a message in an extendable markup language format and determining a recipient for the message. A plurality of devices associated with the recipient are also determined. Each of the devices is associated with a device identifier and a communication type. At least one of the devices having MMS communication capabilities is selected. One or more formats supported by the selected device(s) is determined. The message is adapted to a MMS message. Adapting the message includes transcoding the message to a SMIL format and packaging one or more external files referenced by the message in the transcoded message. The MMS message is then sent to the selected device(s) at the associated device identifier(s).

In a fourth embodiment, a message deliver system is disclosed. The message delivery system comprises a first communications interface to receive a message in a first format. The message delivery system also includes an adapter to adapt the message from the first format to an MMS message and a second communications interface to send the MMS message to a user device. In some embodiments, the system may also include rule mappings, communicatively coupled with the adapter. The rule mappings may map the first format to SMIL and the adapter may use the rule mappings to transcode the message to a SMIL format.

BRIEF DESCRIPTION OF THE DRAWINGS

Illustrative embodiments in accordance with the invention are illustrated in the drawings in which.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Figure 1:
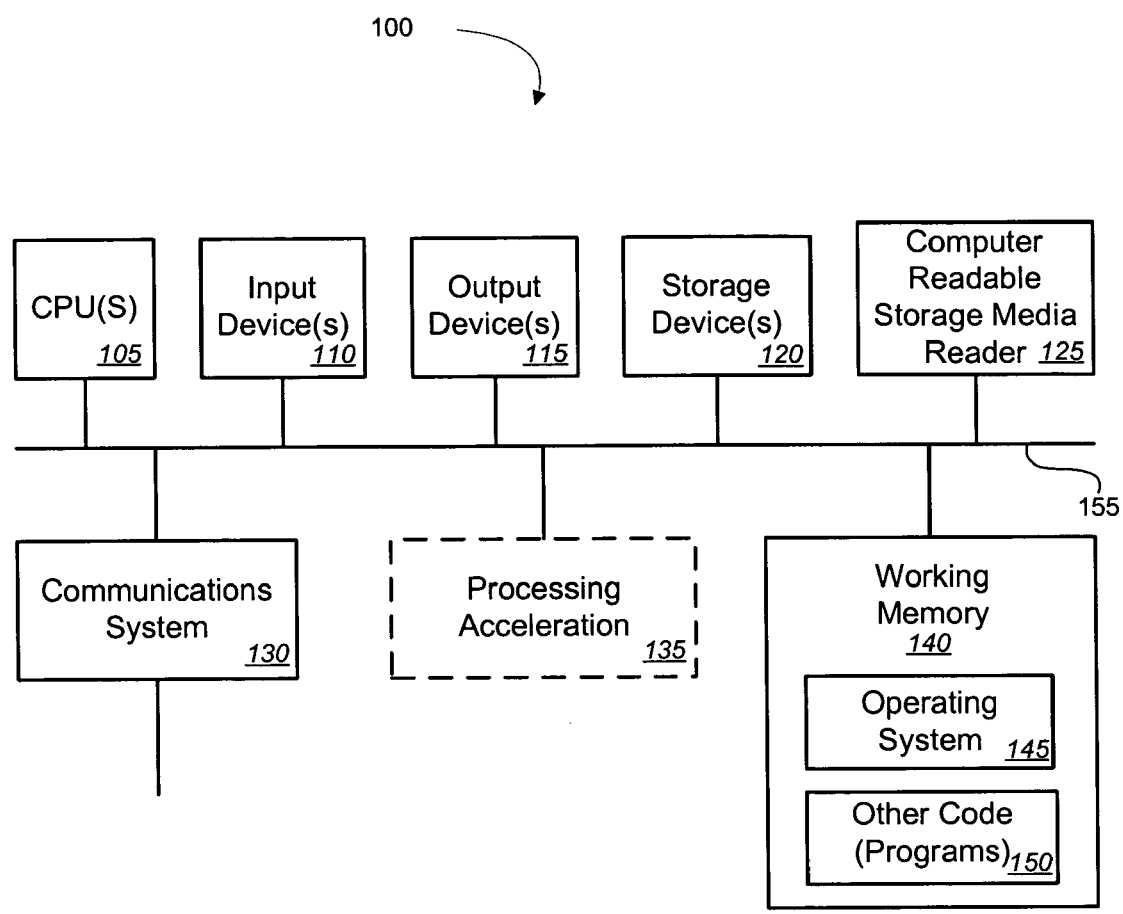
FIG. 1 is a block diagram of an exemplary computer system upon which a message delivery system may be implemented.

FIG. 1 illustrates one embodiment of a computer system 100 upon which a message delivery system that may be used to generate MMS messages for content providers may be implemented. The computer system 100 is shown comprising hardware elements that may be electrically coupled via a bus 155. The hardware elements may include one or more central processing units (CPUs) 105; one or more input devices 110 (e.g., a mouse, a keyboard, etc.); and one or more output devices 115 (e.g., a display device, a printer, etc.). The computer system 100 may also include one or more storage device 120. By way of example, storage device(s) 120 may be disk drives, optical storage devices, solid-state storage device such as a random access memory ("RAM") and/or a read-only memory ("ROM"), which can be programmable, flash-updateable and/or the like.

The computer system 100 may additionally include a computer-readable storage media reader 125; a communications system 130 (e.g., a modem, a network card (wireless or wired), an infra-red communication device, etc.); and working memory 140, which may include RAM and ROM devices as described above. In some embodiments, the computer system 100 may also include a processing acceleration unit 135, which can include a DSP, a special-purpose processor and/or the like.

The computer-readable storage media reader 125 can further be connected to a computer-readable storage medium, together (and, optionally, in combination with storage device (s) 120) comprehensively representing remote, local, fixed, and/or removable storage devices plus storage media for temporarily and/or more permanently containing computer-readable information. The communications system 130 may permit data to be exchanged with a network and/or any other computer.

The computer system 100 may also comprise software elements, shown as being currently located within a working memory 140, including an operating system 145 and/or other code 150, such as an application program. The application programs may implement a message deliver system, components of the message deliver system, and/or the methods of the invention. It should be appreciate that alternate embodiments of a computer system 100 may have numerous variations from that described above. For example, customized hardware might also be used and/or particular elements might be implemented in hardware, software (including portable software, such as applets), or both. Further, connection to other computing devices such as network input/output devices may be employed.

Figure 2:
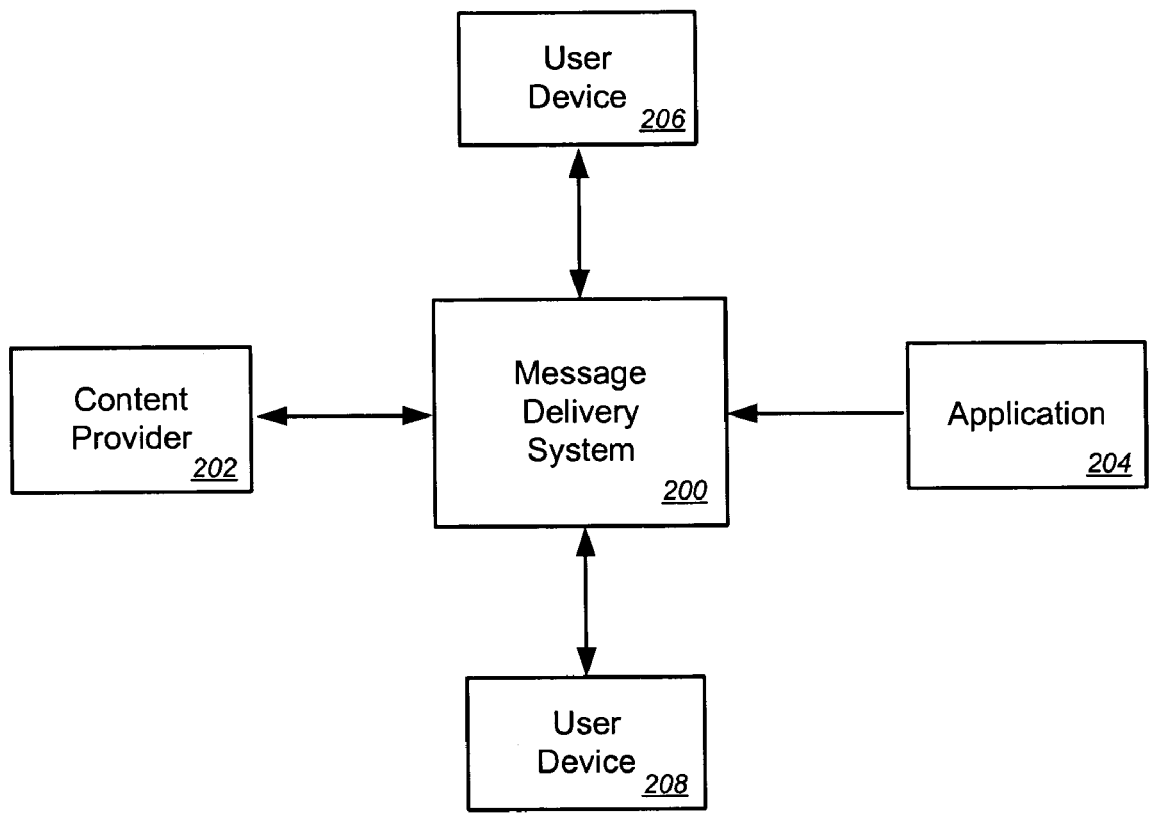
FIG. 2 illustrates an exemplary embodiment of a system that may be used to deliver MMS messages.

FIG. 2 illustrates an exemplary embodiment of a system that may be used to deliver MMS messages. The system 200 includes a plurality of user devices 206, 208. User devices 206, 208 may belong to the same or different user. Each device may have an associated device address or identifier and be able to communicate using one or more communication types. For instance, user device 206 may be a cellular phone with an associated cellular phone number. The cellular phone may be able to communicate using communication types, such as MMS, SMS, email, etc. Devices 206, 208 may also be other types of user devices that have the ability to communicate with MMS, such as computers and personal digital assistants (PDAs).

The system includes a message delivery system 200 communicatively coupled with user devices 206, 208 using a first communications interface. In some embodiments, message delivery system 200 may communicate with user devices 206, 208 via one or more access providers to a wireless network, such as a CDMA, GSM, WLAN, or other type of wireless network. One or more content providers 202 and/or applications 204 are also communicatively coupled with message delivery system 200 using a second communications interface. By way of example, content provider 202 and application 204 may communicate with message delivery system 200 over a web interface, such as the Internet. Content provider 202 may provide a variety of different types of content to user devices 206, 208. Application 204 may provide a variety of different types of application services to other applications. For instances, application 204 may be an Internet application that provides the capability to a user to send messages to user devices 206, 208. As will be described in further detail below, message delivery system 200 may be used to enable content providers 202 and applications 204 to send MMS messages to user devices 206, 208.

Figure 3:
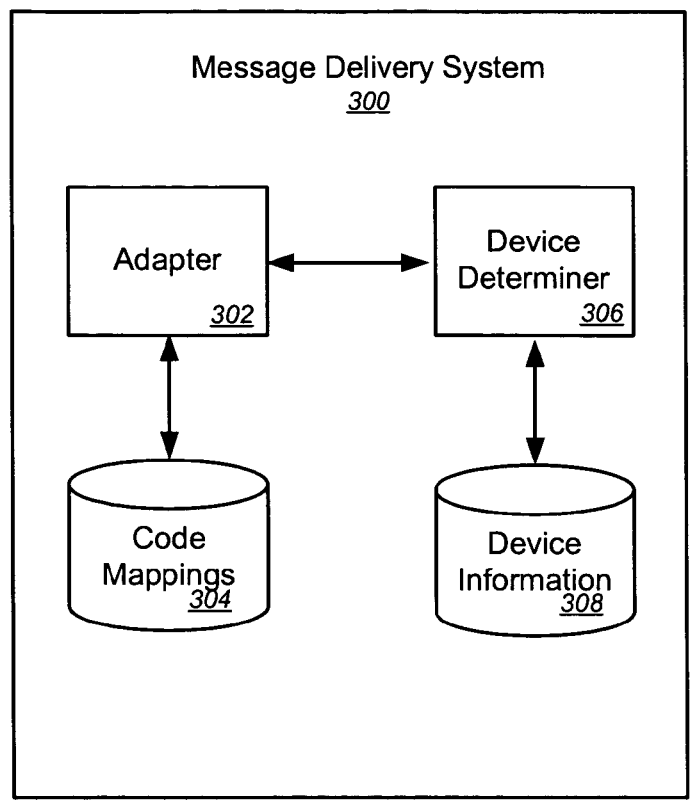
FIG. 3 illustrates an exemplary components of a message delivery system.

FIG. 3 illustrates exemplary components of a message delivery system 300. The message delivery system may include an adapter 302 to adapt messages received in a first format to MMS messages. In some embodiments, messages may be received in an extendable markup language format, such as Extensible Hypertext Markup Language (XHTML), Extended Markup Language (XML), mobile XML, or any other type of extendable markup language. This may provide for the ability of developers to author MMS content and application services providing MMS capabilities using a familiar scripting language. It should be appreciated that this may reduce the cost and time to develop MMS content and applications with MMS capabilities. Messages may also be received using other types of formats.

Message delivery system 300 may include code mappings 304, communicatively coupled with adapter 302, to assist in the adapting of the messages. The code mappings may map the first format to a format (e.g., XHTML, XML) that may be used to create MMS messages, such as SMIL. Code mappings 304 may be stored in a variety of different mechanisms. For instance, code mappings may be Extensible StyleSheet Language Transformations (XSLT). Alternately, code mappings may be stored as a relational database that is adapted to store, update, and retrieve data in response to SQL-formatted commands; spreadsheets, text files, internal software lists, or other suitable structure.

Adapter 302 may adapt messages received in the first format to MMS messages using a variety of techniques. As one example, adapter 302 may include a transcoder which transcodes messages from the first format to another language that may be used to create an MMS message, such as SMIL. Code mappings 304 may be used to assist in the transcoding process. As part of the adapting the message, adapter 302 may retrieve external files referenced by the message and package the retrieved files in the transcoded message. Adapter 302 or another component of message delivery system 300 may then convert the message in the SMIL format to a binary MMS message for delivery to a user device.

In some embodiments, message delivery system 300 may also comprise a device determiner 306, communicatively coupled with adapter 302. Device determiner 306 may be used to determine one or more formats supported by a user device. Thus, device determiner 306 is communicatively coupled with device information 308. Device information 308 may contain information on user devices. Such information may include formats supported by a user device that indicate the types of audio, graphic, or other multimedia formats that may be viewed by a device, and/or communication capabilities of the device indicating the communication types (e.g., MMS, instant messaging, email, SMS) supported by the device. Other information about user devices, such as device addresses, may also be included in device information 308. It should be appreciated that any suitable data storage structure may be used to store device information 308, such as a relational database, spreadsheet, text file, internal software list, XML file, or other data storage structure.

Adapter 302 may communicate with device determiner 306 during the process of adapting the message from the first format to the MMS format. This may provide the ability for adapter 302 to adapt messages to formats supported by a user's device. For instance, a user device may support Joint Photographics Expert Group (JPEG) format for graphics, but not a Portable Network Graphics (PNG) format. After obtaining device information for a user device, adapter 302 may convert unsupported format types to a format understandable by the user device.

In the configuration described above, different components were described as being communicatively coupled to other components. A communicative coupling is a coupling that allows communication between the components. This coupling may be by means of a bus, cable, network, wireless mechanism, program code call (e.g., modular or procedural call) or other mechanism that allows communication between the components. Thus, it should be appreciated that adapter 302, code mappings 304, device determiner 306, and device information 308 may reside on the same or different physical devices. Additionally, it should be appreciated that in alternate embodiments, the system described in FIG. 3 may contain additional or fewer components.

FIG. 2 and FIG. 3 both describe embodiments in which adapter 302 is a component of a message delivery system 300. Thus, the message delivery system 302 may be considered a Multimedia Messaging Service Center (MMSC). In alternate embodiments, an adapter may be a standalone system that interfaces with a separate MMSC. In these embodiments, the adapter may be used to transcode messages received in a first format (e.g., XML, XHTML) to a format supported by the MMSC (e.g., SMIL). The adapter may also be communicatively coupled with code mappings that map the first format to the transcoded format. Optionally, the adapter may also have or be able to obtain device information which contains formats, communication capabilities, and other device information for user devices.

Figure 4:
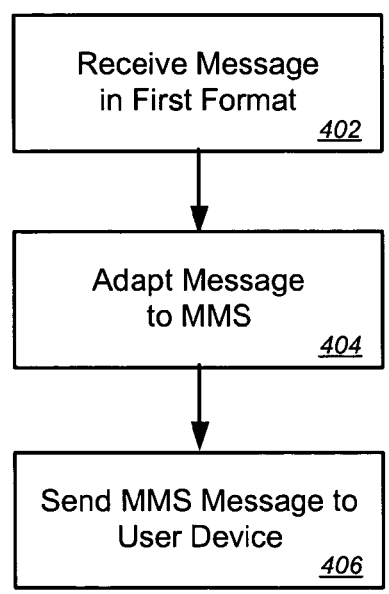
FIG. 4 is a flow diagram of a method for sending MMS messages according to one embodiment.

FIG. 4 illustrates an exemplary method that may be used to send MMS messages to user devices. The method may begin by receiving 402 a message in a first format. For instance, the message may be received in an extendable markup language format, such as XHTML or XML. The message is then adapted 404 to a MMS message. In some embodiments, the message may first be transcoded to an intermediate language, such as SMIL. This may be accomplished by using code mappings, such as XSLT, which map the first format to SMIL. The message may then be converted to a binary format of MMS for delivery to user devices. In alternate embodiments, the message in the intermediate format may be sent to a MMSC for delivery to a user device. Other techniques may also be used to adapt 404 the message in the first format to an MMS message.

In some embodiments, the message in the first format may reference one or more external files, such as audio, graphic, or streaming video files. As part of the adapting 404 the message, these external files may be obtained and packaged within the MMS message or intermediate format supported by an MMSC. After the message is adapted 404 to an MMS message, it is sent 406 to a user device. Alternately, in some embodiments, instead of an MMS message being sent 406, a message in an intermediate format, such as SMIL, may be sent to an MMSC for delivery to a user device.

Figure 5:
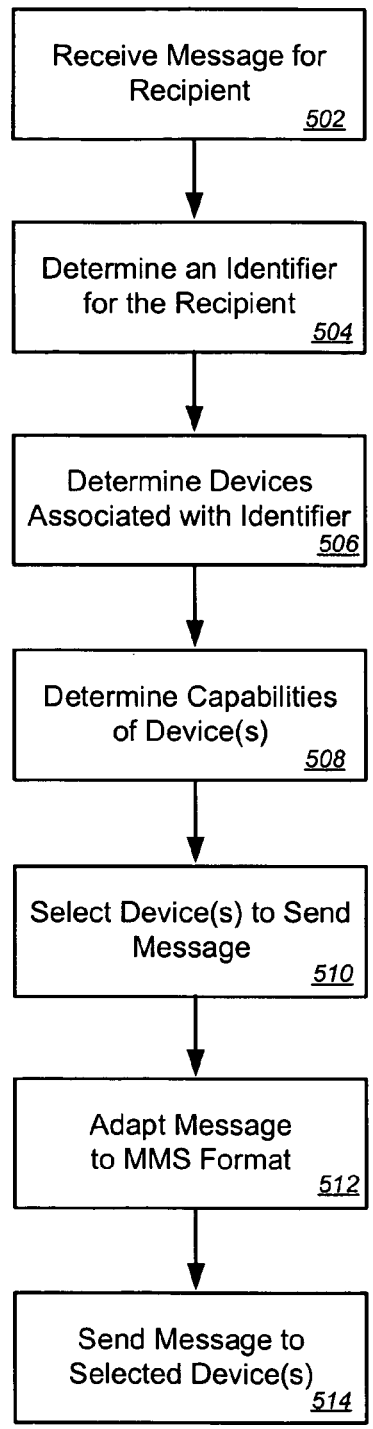
FIG. 5 is a flow diagram illustrating a second exemplary embodiment of sending MMS messages.

FIG. 5 illustrates a second exemplary embodiment of sending MMS messages. The method may begin by receiving 502 a message for a recipient. The message may have been sent by a content provider or an application. A content provider or an application may have sent the message. The received message may be addressed to a recipient. The address may identify a physical address of a device associated with the recipient. In another embodiment, the message may identify the recipient using an identifier (e.g., a unique username for message delivery system 102) that is not an address of a device. Accordingly, the sender of a message may not need to specify the address of a device that will ultimately receive the message. For example, the received message may specify send an MMS message to a user without specifying a cellular phone number. Additionally, as will be described in further detail below, even when the sender specifies a particular device address, in some cases the message may ultimately be sent to an alternate device or additional devices.

The method may also include determining 504 an identifier for the recipient. The identifier may be any username that uniquely identifies the recipient. For example, the identifier may be an address of any of the devices associated with the recipient. Also, the identifier may be a universal identifier that is not an address for a device of the recipient. The determined identifier may be used to determine 506 devices associated with the recipient. For example, if the recipient communicates using the communication types of MMS, email, IM, and SMS, the identifier may be linked to device types for those communication types and any addresses that are needed to communicate with the recipient through those communication types. Any number of devices may be associated with a user depending on the number of devices a user is using to communicate. The devices may be registered with message delivery system by the user or by another entity. When a device is registered, it may be associated with the user's identifier. The identifier may also be linked to other information, such as user preferences. User preferences may be information for devices that the user prefers to communicate with and a priority scheme for sending messages to the recipient, etc.

The capabilities of the devices associated with the identifier may also be determined 508. This may include determining the communication capabilities of the devices, including whether MMS is supported. The determining 508 of capabilities may also include determining the formats supported by a device, such as audio or graphic file formats supported by the device's Internet browser.

One or more devices are selected 510 to send the message to the recipient. Additionally, the address(es) for the selected device(s) is also determined. One criteria used to select a device includes whether the device capabilities indicate the device supports MMS messages. If there are a plurality of devices associated with the recipient that support MMS messages, the device selection may also include other criteria, such as user preferences and/or device presence information indicating whether messages may be currently communicated to the device.

User preferences that may be used to select 510 a device may be static or dynamic. For example, a user may specify a priority scheme for determining devices. The message delivery system may then determine if it is feasible to send the message to the first device in the user's preferences. If it is possible, the message is sent to the first device and if it is not possible, message delivery system determines if the message can be sent to the second device in the user's preferences, and so on. Also, if multiple devices are selected, the priority scheme may indicate that a certain device should be selected. Other user preferences may indicate that if certain content is found in a message, a certain device should be used. Also, static preferences may be specified, such as send messages to a first device during work hours and send message to a second device during other hours.

Device presence information may also be used to select device(s) to send the message. For example, presence information may indicate a user is actively using certain devices. For example, a first user device may be actively in communications with a access provider which indicates an active presence. Thus, the first user device may be the preferred way to reach the user. Hints from the content provider or application may also be used to determine the device in which to send the message. For example, the content provider or application that sent the message sent may specify that a specific device should be selected first, if possible. Also, hints that override stored preferences may also be specified.

Returning back to FIG. 5, the method further includes adapting 512 the message from the first format to an MMS message. As previously described, the message may be adapted by first transcoding the message to an intermediate format, such as SMIL and then converting the message in the SMIL format to a binary MMS format. As part of the adapting, external files referenced by the message may be packaged within the message. Additionally, the message may be formatted to supported formats of the device. For example, audio files may be converted to an audio format supported by the device. As another example, graphics files may be converted to a graphic format supported by the device. Other types of formatting, such as converting other types of multimedia content, shrinking of graphics to fit within a device display, or deleting unsupported formats, may also be performed as part of the adapting 512 the message.

The MMS message is then sent 514 to the selected device (s). Thus, content providers and applications may use a message delivery system to send MMS messages to user devices. The content providers and applications may author the messages in a familiar scripting language, such as XML or XHTML, and then rely on the messaging center to adapt the message to an MMS message. The messaging center may also be used to determine which device associated with the recipient to send a message. Additionally, the messaging center may be used to convert associated multimedia content to formats supported by user devices.

Figure 6:
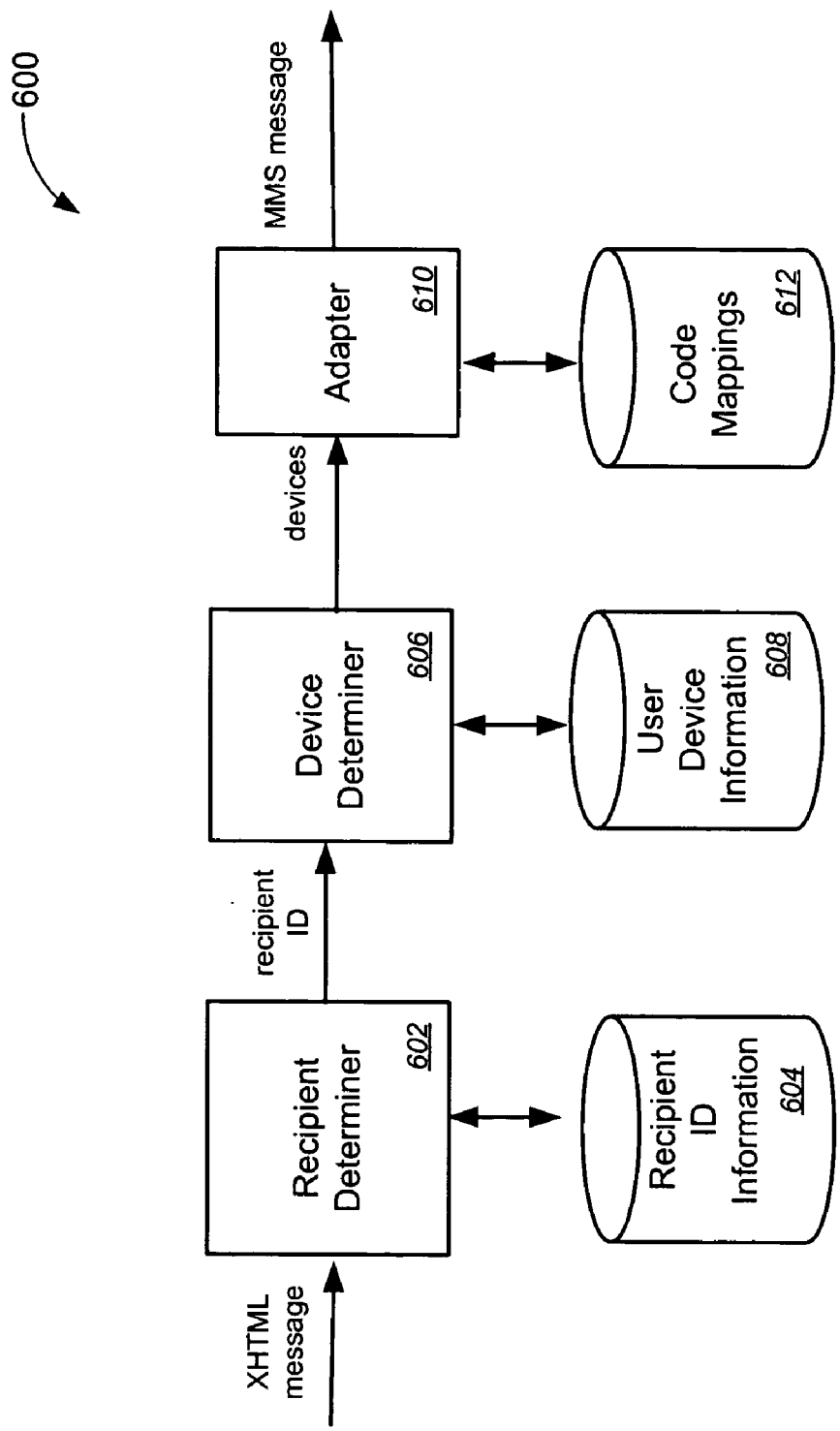
FIG. 6 illustrates a second exemplary embodiment of a message delivery system.

FIG. 6 illustrates a second exemplary embodiment of a message delivery system 600. The message delivery system 600 includes a recipient determiner 602, a device determiner 606, and an adapter 610. Recipient determiner 602 receives a message in a first format, such as an extendable markup language format (e.g., XHTML, XML) and outputs a recipient identifier. Recipient determiner 602 may be communicatively coupled with recipient identification information 604, which may be used by recipient determiner 602 to determine the recipient identifier. The recipient identification information 604 may include information for a plurality of recipients. For example, each recipient may be associated with a universal identifier. The universal identifier may also be associated with the physical addresses of the communication types for each user. Alternatively, the addresses for a recipient may be associated with each other instead of using a universal identifier. When one of the addresses is encountered, other addresses for the user may be determined. Accordingly, recipient determiner 602 may performs the functions described in blocks 502 and 504 of FIG. 5.

Device determiner 606 may receive the determined recipient identifier from recipient determiner 502 and may select one or more devices in which to send the message. In selecting the device, device determiner 606 may communicate with a data storage 608 that includes user device information. User device information may include information for communication types for recipient devices. The device information 608 may also include other device information, such as the formats supported by a device and the address associated with a device. Accordingly, device determiner 606 may perform the functions described in step 506, 508, and 510 of FIG. 5.

Adapter 610 may receive the selected device(s), device address(es), and formats supported by the device(s) from device determiner 606. The adapter 610 may then adapt the message from the first format to an MMS message. Adapter 610 may use information contained in code mappings 612 to assist in the adaptation of the message. Also, the message may be adapted to formats and display capabilities of the selected device(s). Accordingly, adapter 610 may perform the functions described in block 512 of FIG. 5.

The message delivery system 600 may then communicate the MMS message to the selected user device(s). Accordingly, message delivery system 600 allows content providers and applications to send MMS messages that may have been authored in a familiar scripting language, such as XHTML or XML, to user devices. Additionally, by using message delivery system 600, the content providers/applications may not need to know how to reach any devices associated with a recipient in order to send an MMS message. Instead, the message delivery system 600 may determine how to best send the message to the recipient.

Although message delivery systems 200, 300, and 600 were described as communicating MMS messages to user device(s) it should be appreciated that in some embodiments message delivery systems 200, 300, and 600 may also be used to communicate messages in other types of formats, such as SMS, IM, email, etc. Furthermore, in addition to communicating MMS messages to user devices, message delivery systems 200, 300, and 600 may also be used for communications between user devices, and for communications from user devices to content providers and applications.

In the foregoing description, for the purposes of illustration, methods were described in a particular order. It should be appreciated that in alternate embodiments, the methods may be performed in a different order than that described. Additionally, the methods may contain additional or fewer steps than described above. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method comprising:
receiving a message in an extendable markup language (XML) format, the message referencing one or more external files;
determining a recipient, wherein the recipient is associated with a plurality of devices capable of receiving messages;
determining the plurality of devices associated with the recipient, each device associated with a device identifier and a communication type;
obtaining communication capabilities for the plurality of devices;
selecting at least one of the devices having MMS communication capabilities, the at least one device being associated with at least one device identifier, wherein selecting the at least one of the devices comprises selecting the device, from the plurality of devices capable of receiving messages, based at least in part on device presence information, which indicates that the recipient is actively using the selected device;
determining one or more formats supported by the selected at least one device;
adapting the message to a multimedia messaging service (MMS) message, wherein the adapting includes transcoding the message from the XML format to a Synchronized Media Integration Language (SMIL) format, obtaining the one or more external files referenced by the message in the XML format, packaging the obtained one or more external files in the SMIL message, and converting the SMIL message packaged with the one or more obtained external files to the MMS message; and
sending the MMS message to the at least one selected device at the associated at least one device identifier.

2. The method of claim 1, wherein transcoding the message comprises transcoding the message using mappings mapping the first format to SMIL.

3. The method of claim 2, wherein the mappings comprise Extensible StyleSheet Language Transformations (XSLT).

4. The method of claim 1, wherein converting the message further comprises converting the message in the SMIL format to a binary format.

5. The method of claim 1, further comprising determining one or more formats supported by the device.

6. The method of claim 5, wherein the one or more external files include a graphic file and wherein converting the message comprises converting the graphic file from a first graphic format to a second graphic format supported by the selected device and based on device preference information for the selected device.

7. The method of claim 5, wherein the one or more external files include an audio file and wherein converting the message comprises converting the audio file from a first audio format to a second audio format supported by the selected device and based on device preference information for the selected device.

8. The method of claim 1, wherein selecting the device associated with the recipient comprises:
    determining a plurality of devices associated with the recipient; and
    selecting at least one of the plurality of devices in which to send the MMS message.

9. The method of claim 8, wherein selecting at least one of the plurality of devices comprises:
    obtaining communication capabilities for the plurality of devices; and
    determining at least one of the plurality of devices having MMS communication capabilities.

10. The method of claim 8, wherein selecting at least one of the plurality of devices further comprises selecting at least one of the devices having MMS communication capabilities, the selecting based at least in part on user preferences.

11. A system comprising:
    a first communications interface, to receive a message an extendable markup language format (XML) message referencing a plurality of external files;
    a recipient determiner to determine a recipient, wherein the recipient is associated with a plurality of devices;
    a device determiner to select a device associated with the recipient, the device being associated with a device identifier, wherein selecting a device associated with the recipient comprises selecting a device, from the plurality of devices, based at least in part on device presence information, which indicates that the recipient is actively using the selected device;
    an adapter, to transcode the XML message to a Synchronized Media Integration Language (SMIL) format message, to retrieve the plurality of external files referenced by the XML message, convert the retrieved files from a first format to a second format supported by the selected device and based on preference information for the selected device, to package the converted files in the transcoded SMIL format message, and convert the SMIL message with the converted files to a multimedia messaging service (MMS) format message; and
    a second communications interface, to send the MMS format message to a Multimedia Messaging Service Center (MMSC).

12. The system of claim 11, wherein transcoding the message comprises transcoding the message using mappings mapping the first format to SMIL.

13. The system of claim 12, wherein the mappings comprise Extensible StyleSheet Language Transformations (XSLT).

14. The system of claim 11, wherein converting the message further comprises converting the message in the SMIL format to a binary format.

15. The system of claim 11, further comprising determining one or more formats supported by the device.

16. The system of claim 15, wherein the one or more external files include a graphic file and wherein converting the message comprises converting the graphic file from a first graphic format to a second graphic format supported by the selected device and based on device preference information for the selected device.

17. The system of claim 15, wherein the one or more external files include an audio file and wherein converting the message comprises converting the audio file from a first audio format to a second audio format supported by the selected device and based on device preference information for the selected device.

18. The system of claim 11, wherein selecting the device associated with the recipient comprises:
    determining a plurality of devices associated with the recipient; and
    selecting at least one of the plurality of devices in which to send the MMS message.

19. The system of claim 18, wherein selecting at least one of the plurality of devices comprises:
    obtaining communication capabilities for the plurality of devices; and
    determining at least one of the plurality of devices having MMS communication capabilities.

20. The system of claim 18, wherein selecting at least one of the plurality of devices further comprises selecting at least one of the devices having MMS communication capabilities, the selecting based at least in part on user preferences.

21. At least one machine-readable memory, having stored thereon sequences of instructions, which, when executed by a machine cause the machine to:
    receive a extendable markup language (XML) message identifying a plurality of external files;
    determine a recipient, wherein the recipient is associated with a plurality of devices;
    select a device associated with the recipient, the device being associated with a device identifier, wherein selecting a device associated with the recipient comprises selecting a device, from the plurality of devices, based at least in part on device presence information, which indicates that the recipient is actively using the selected device;
    adapt the message to a Multimedia Messaging Service (MMS) format, wherein adapting the message includes transcoding the XML message to a Synchronized Media Integration Language (SMIL) message, obtaining the plurality of external files identified by the XML message, packaging the obtained external files in the SMIL message, and converting the SMIL message packaged with the obtained external files to a MMS message; and
    send the MMS message to a Multimedia Messaging Service Center (MMSC) for delivery to the selected device.

22. The machine-readable memory of claim 21, wherein transcoding the message comprises transcoding the message using mappings mapping the first format to SMIL.

23. The system of claim 22, wherein the mappings comprise Extensible StyleSheet Language Transformations (XSLT).

24. The machine-readable memory of claim 21, wherein converting the message further comprises converting the message in the SMIL format to a binary format.

25. The machine-readable memory of claim 21, further comprising determining one or more formats supported by the device.

26. The machine-readable memory of claim 25, wherein the one or more external files include a graphic file and wherein converting the message comprises converting the graphic file from a first graphic format to a second graphic format supported by the selected device and based on device preference information for the selected device.

27. The machine-readable memory of claim 25, wherein the one or more external files include an audio file and wherein converting the message comprises converting the audio file from a first audio format to a second audio format supported by the selected device and based on device preference information for the selected device.

28. The machine-readable memory of claim 21, wherein selecting the device associated with the recipient comprises:

determining a plurality of devices associated with the recipient; and selecting at least one of the plurality of devices in which to send the MMS message.

29. The machine-readable memory of claim 28, wherein selecting at least one of the plurality of devices comprises:

obtaining communication capabilities for the plurality of devices; and determining at least one of the plurality of devices having MMS communication capabilities.

30. The machine-readable memory of claim 28, wherein selecting at least one of the plurality of devices further comprises selecting at least one of the devices having MMS communication capabilities, the selecting based at least in part on user preferences.

* * * * *

UNITED STATES PATENT AND TRADEMARK OFFICE
CERTIFICATE OF CORRECTION

| | |
|---|---|
| PATENT NO. | : 8,161,117 B2 |
| APPLICATION NO. | : 10/933836 |
| DATED | : April 17, 2012 |
| INVENTOR(S) | : Ye et al. |

It is certified that error appears in the above-identified patent and that said Letters Patent is hereby corrected as shown below:

In column 9, line 37, in Claim 11, after "message" insert -- in --.

In column 10, line 62, in Claim 23, delete "system of claim 22" and insert -- machine-readable memory of claim 22 -- thereof.

Signed and Sealed this
Thirty-first Day of July, 2012

David J. Kappos
*Director of the United States Patent and Trademark Office*